United States Patent [19]
Kleppen

[11] Patent Number: 5,685,771
[45] Date of Patent: Nov. 11, 1997

[54] ENCLOSURE FOR MAINTAINING A CONTROLLED ATMOSPHERE AROUND A WORK STATION

[75] Inventor: Arthur L. Kleppen, Kent, Wash.

[73] Assignee: C-K Worldwide Inc., Auburn, Wash.

[21] Appl. No.: 672,969

[22] Filed: Jul. 1, 1996

[51] Int. Cl.⁶ .................................................. B08B 15/02
[52] U.S. Cl. ................................ 454/56; 219/72; 312/1
[58] Field of Search ................................ 454/49, 56, 57; 312/1; 600/21; 219/72

[56] References Cited

U.S. PATENT DOCUMENTS

| | | | |
|---|---|---|---|
| 1,977,386 | 10/1934 | Holes | 454/56 |
| 2,459,812 | 1/1949 | Griffiths . | |
| 2,786,740 | 3/1957 | Taylor et al. | 312/1 |
| 4,026,286 | 5/1977 | Trexler | 128/204 |
| 4,332,996 | 6/1982 | Janssen | 219/76.14 |
| 4,437,710 | 3/1984 | MacFarland et al. | 312/1 |
| 5,018,321 | 5/1991 | Wardlaw III | 52/2.17 |
| 5,257,957 | 11/1993 | Diccianni et al. | 454/57 |
| 5,262,578 | 11/1993 | Hall | 454/56 X |
| 5,316,541 | 5/1994 | Fischer | 600/21 |
| 5,410,120 | 4/1995 | Taylor | 219/72 |

*Primary Examiner*—Harold Joyce
*Attorney, Agent, or Firm*—Keith D. Gehr

[57] ABSTRACT

An enclosure enveloping a work area with a controlled gaseous atmosphere. It is particularly useful as a welding enclosure for welding metals in a total atmosphere of inert gas. The enclosure consists of a basal portion which rests on a table or work bench of similar dimensions and geometry. A short lower portion is preferably of somewhat smaller horizontal cross section than an attached much larger upper portion. A gas diffusion ring is located inside about midway between the top and bottom. There is a recloseable gas tight opening in or adjacent the top for introducing workpieces and a one way vent valve at or adjacent the highest point on the top. When ready for introducing the workpiece the hood drapes neatly and uniformly around the workbench and the gas diffusion ring is enclosed at the lowest part of the draped portion. Argon is the inert gas of preference. When it is introduced it displaces any remaining air ahead of it and ultimately out the vent valve. Because of its construction the hood may be purged of any remaining air and ready for use within minutes with a minimum waste of inert gas.

5 Claims, 2 Drawing Sheets

5,685,771

ENCLOSURE FOR MAINTAINING A CONTROLLED ATMOSPHERE AROUND A WORK STATION

The present invention relates to an enclosure or hood for establishing and maintaining a localized controlled atmosphere around a work area. It is particularly useful for welding metals where the weld would be contaminated by the presence of ambient atmospheric gases.

BACKGROUND OF THE INVENTION

Many so-called exotic metals are now used in applications ranging from nuclear reactors to external skins and jet engine parts of supersonic aircraft. Exemplary metals might be titanium, zirconium and hafnium. When it is necessary to weld these metals, this must be done in an atmosphere of one of the so-called inert or noble gases, typically helium or argon, in order to prevent embrittlement of the weld zone. Argon has now become the more commonly used blanketing gas for this application. The exotic metals are quite expensive. For this reason they are only used in critical applications and any weld failure is not tolerable since it might result in a catastrophic failure of the entire system.

The art has tried to address the need of welding these metals in an inert atmosphere but the systems available have not been entirely satisfactory to date. For one reason, the blanketing gases themselves are relatively expensive and it has been necessary to waste large quantities of them in order to completely flush or purge any residual air from the enclosure in which the welding is carried out. Some examples of these prior systems can be noted as follows.

Griffiths, in U.S. Pat. No. 2,459,812 shows what is basically a bell jar placed over the work area. Hydrogen gas is admitted at the top and discharged from the bottom. A welding torch is inserted through the side wall inside a flexible bellows. An umbrella-like closure at the bottom that provides a crude seal.

Janssen, in U.S. Pat. No. 4,332,996, shows an enclosure for an automatic welder used to hard surface crawler tracks. It does not have a controlled inside atmosphere. The welding heads are conventional tungsten inert gas torches that provide only a localized inert gas blanket on one surface of the weld.

MacFarland et al., in U.S. Pat. No. 4,437,710, show a small flexible welding enclosure affixed behind a rigid vertical front wall having gloved access to the inside. A door in the front wall provides entry for the workpiece and welding supplies. There is also a viewing window for the welder on the front wall. The enclosure is first collapsed by evacuation then filled with an inert gas from a supply line in the bottom.

Wardlaw III, in U.S. Pat. No. 5,018,321, shows a flexible air supported dome that totally encloses the welder. There is no provision for creation of an inert gas atmosphere.

Taylor, in U.S. Pat. No. 5,410,120, describes a large enclosure for a number of welders. It has a downward substantially laminar flow of air over the work area to remove welding fumes. Air is vented out through the floor.

Taylor et al., in U.S. Pat. No. 2,786,740, describe an enclosure with a transparent face that is flexible and can be collapsed and folded flat. It has hermetically sealed gloves and a zippered inlet section for admitting supplies. The inside atmosphere is controlled. Lighter than air inert gases are admitted at the top of the enclosure and the purge gas discharged from the bottom. A slight over-pressure is maintained inside to maintain inflation. The workers gloves (actually mittens) are of thin plastic and are compressed against the workers hands by the inside pressure. This enclosure appears to be aimed at medical uses rather than welding.

Holes, U.S. Pat. No. 1,977,386 shows a portable sandblasting hood that is suspended from a chain fall on a trolley. The top is rigid and transparent with a number of openings in the side for worker access. The flexible sides can be gathered at the bottom around the work bench to prevent the escape of dust. The sides blouse over the edges of the bench to catch sand and cuttings.

These earlier attempts to provide a localized inert gas environment for welding or other uses all have shortcomings, They either have only a very small work area or require long purging times with consequent waste of expensive inert gas. The invention to now be described efficiently overcomes these deficiencies.

SUMMARY OF THE INVENTION

The present invention is a portable enclosure that enables a welding or other work area to be completely and economically surrounded with an inert or otherwise benign gas. It comprises a completely enclosed flexible and collapsible transparent hood that surrounds the work area. By collapsible is meant that the hood is not itself self supporting unless inflated with a gas at a very slight superatmospheric pressure. In that regard it can be somewhat likened to a balloon.

The enclosure will have a basal portion that will rest on a work bench or table. Most preferably the bench or table should have a flat and smooth surface supporting the enclosure that is of similar dimensional geometry to that of the basal portion. The reasons for this will be explained shortly. While the hood may be of any shape in horizontal cross section, normally it will be rectangular, square, or circular. An upper portion hermetically attached to the basal portion will constitute the bulk of the surface area and inflated volume. All or a very substantial part of the upper portion should be transparent for worker visibility.

At least one pair of suitable gloves or mittens for the workers hands will be hermetically sealed into the sidewall of the enclosure. These may be of impermeable plastic or they can also be more conventional gloves or mittens such as welder's gloves having very slight gas permeability. Additionally, there will preferably be at least one sleeve on the sidewall giving access for any necessary electrical cables or other utilities required, such as those for the welder head and ground connection. A reclosable, essentially gas tight opening is provided on the hood to allow insertion of the parts to be welded as well as any tools such as jigs, clamps, welding rods, etc. This is most preferably located on the top of the hood although that is not absolutely essential.

A principal feature of the hood is the provision for exhausting any ambient air and refilling with the inert gas with a minimum of wasted purge gas and time. One critical part of this is a gas diffusion ring located entirely around the inner circumference of the upper portion of the enclosure at a location about midway between the upper and lower surfaces. It is to take advantage of this feature that the enclosure should preferably be placed on a table having similar basal dimensions. This allows the hood to neatly drape around the edges of the work table when uninflated so as to be out of the way and give maximum and easy access to the interior through the opening. This design is particularly advantageous since by allowing the neat and controlled drape the worker does not have to dig through a lot of disordered and jumbled folds for access when necessary as is the case when more conventional collapsible hoods are used. An additional very major advantage is that folds and pockets that tend to trap interior air and require long purge times are almost completely eliminated.

The access opening is normally fitted with a closure such as a zipper although other well known closure devices are also suitable. This is opened so that the worker can place the workpieces and any necessary tools onto the basal portion. The opening is then closed to begin the step of purging air. At this time the gas diffusion ring will be at or very near the lowest part of the fold that comprises the draped area. First a low vacuum is preferably drawn to remove most of the remaining air from the enclosure. Then a gas of the desired composition is admitted through the diffusion ring. For welding, the gas is preferably argon which is significantly heavier than air, their respective densities near room temperature being about 1.78 g/L in contrast to 1.17 g/L.

The diffusion ring is designed to admit the inert gas with a minimum of turbulence; i.e., as nearly as possible in laminar flow. When the inert gas is argon, by admitting it at the lowest point in the enclosure it then displaces any remaining small amount of air ahead of it with a minimum of mixing as the enclosure inflates. A small flow of gas is maintained throughout the subsequent operation to maintain inflation and provide a low positive pressure to prevent any entry of outside air. This flow is permitted by a small check or bleed valve at the top of the enclosure.

In a preferred construction of the enclosure the basal portion is of smaller horizontal cross sectional area than the upper portion. This permits neater and more uniform draping around the work table when the enclosure is in uninflated condition.

While the description to date has been primarily directed to use as a welding enclosure, it will be evident that other uses could be equally appropriate. Among such uses might be packaging or other treatment of air sensitive materials such as certain pharmaceutical materials or pyrophoric compositions.

It is thus an object to provide an enclosure for maintaining an inert gas atmosphere around a work zone.

It is a particular object to provide an enclosure for welding air sensitive metals in an inert gas environment.

It is another object to provide an enclosure that can be quickly filled with an inert or other gas with a minimum of wastage when purging any remaining air from the enclosure.

It is yet an object to provide an enclosure that permits easy initial access to a work surface without having to dig through disordered folds of material.

These and many other objects will become readily apparent upon reading the following detailed description taken in conjunction with the drawings.

DETAILED DESCRIPTION OF THE PREFERRED EMBODIMENTS

Figure 1:
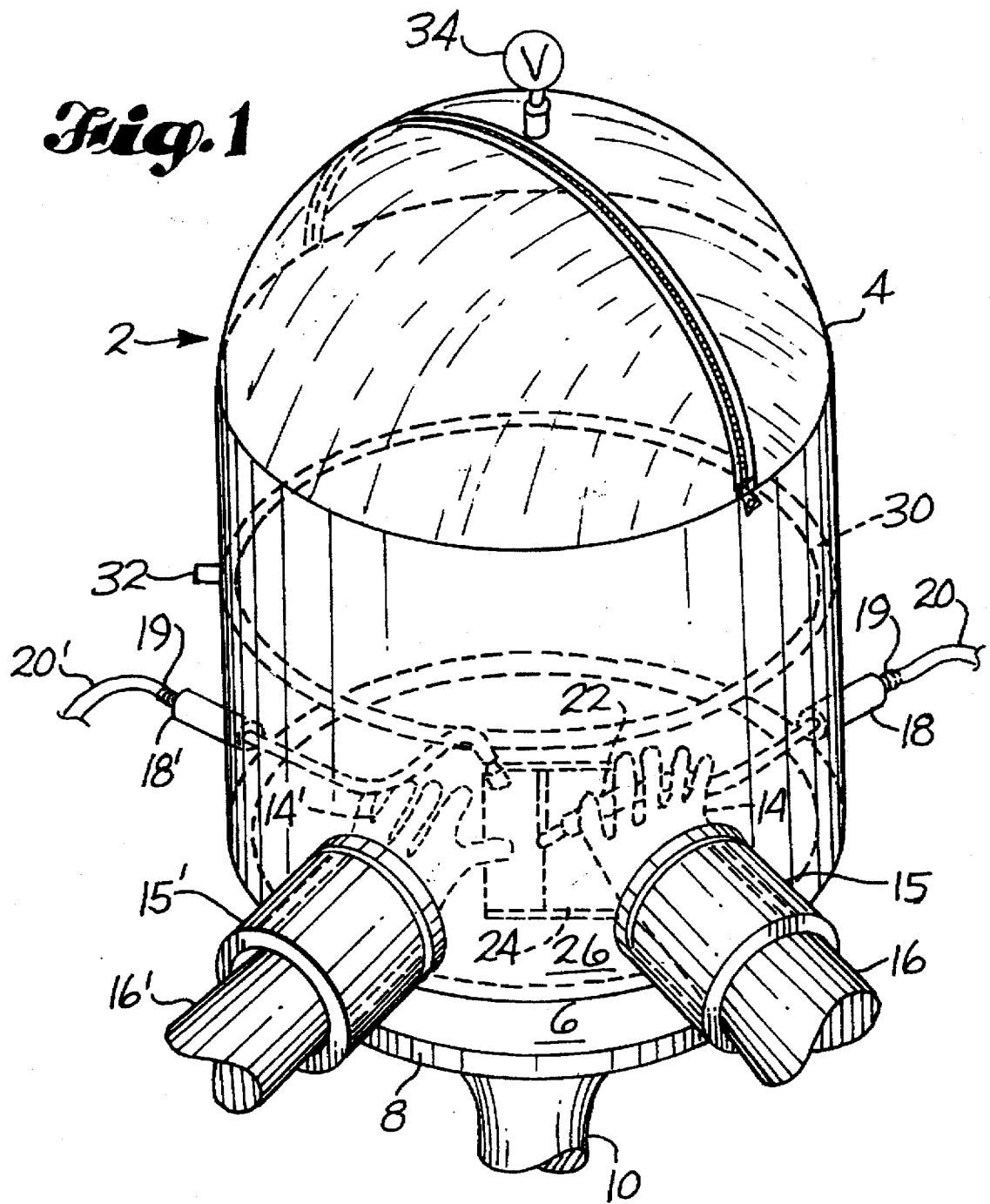
FIG. 1 shows a perspective view of the hood from the front when in use during a welding operation.

The invention can now be readily understood in detail by referring to the drawings. A welding operation in an inert gas atmosphere is used as an example. In FIG. 1 is seen a welder at work while welding an air sensitive metal. The enclosure of the invention is shown generally at 2. It consists of an upper flexible and transparent portion 4 and a lower portion 6 of somewhat smaller diameter. Upper portion 4 will comprise the great bulk of the surface area and enclose a corresponding major portion of the volume of the enclosure. It will normally be fabricated from relatively heavy gage polyvinyl chloride (PVC) sheeting but other plastic materials having the necessary flexibility and transparency are also suitable. PVC is particularly desirable if the enclosure is to be used for welding because of its fire resistant qualities.

Enclosure 2 sits on a work stand having a table 8 and standard 10. The table is most preferably of similar geometric configuration and dimensions as the basal portion 6 of the enclosure.

The enclosure is provided with a zippered opening 12 across the top. When the enclosure is deflated this allows ready insertion of necessary materials such as the workpieces being welded, clamps, welding rods, etc. This may be located as shown, transversely across the top, or it may be located generally around the circumference; e.g., at a location near the numeral 4 in FIG. 1.

Figure 5:
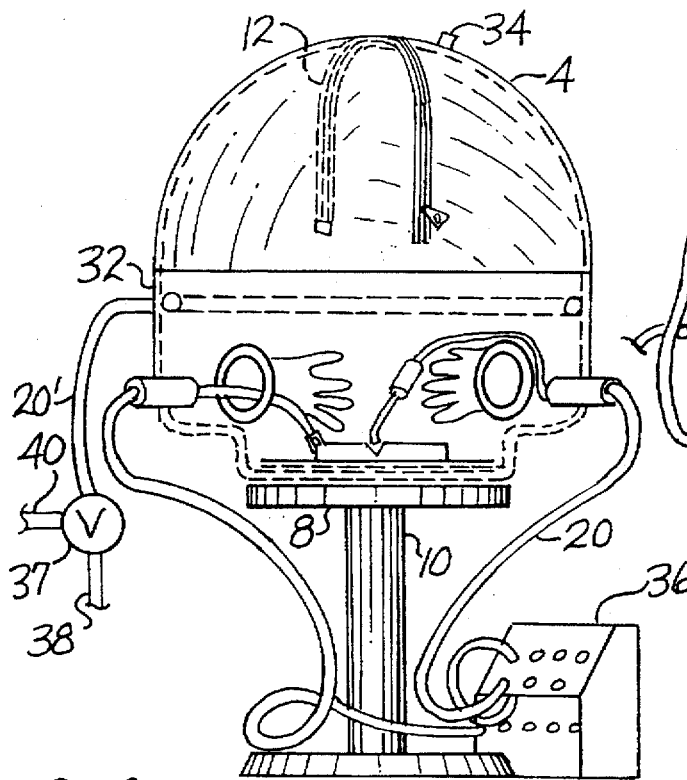
FIG. 5 is a front elevation, similar to FIG. 1 showing the enclosure fully inflated and ready for a welding operation.

At least one pair of gloves 14, 14' are inserted through the sidewall. While this is preferably above the basal section 6 this entry location is not critical. The gloves may be attached inside short cuffs 15, 15', as in FIG. 1, or they may be fastened directly to the sidewalls as shown in FIG. 5. At any time the welder can readily insert or remove his hands 16 into the gloves 14.

It is useful to have access tubes 18, 18' sited in the side of the enclosure. Such necessities as electrical and similar cables 20, 20' enter at this point These points of entry can be made essentially gas tight by simply folding any excess material in the access tubes around the cables and then temporarily securing them with duct tape, clamps, or similar simple closures as at 19, 19'.

Inside the enclosure the welder holds an appropriate welding torch 22 to effect the weld on his workpiece 24.

To protect the base of the enclosure from penetration by any weld splatter or sharp corners it is desirable to include a base plate 26 which covers most or all of the inside bottom of the enclosure. This may be made of wood, a wood composite board, light sheet metal, or some combination of these and is easily inserted or removed from the upper opening.

Figure 2:
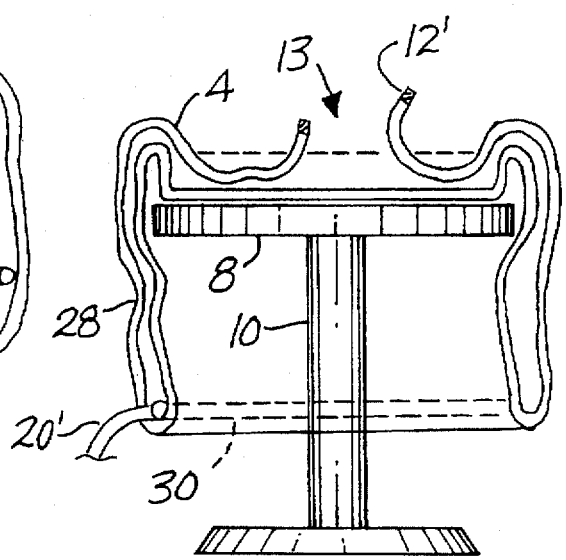
FIG. 2 is a view, partially in section, of the enclosure when deflated and opened for insertion of any workpieces and tools.

A principal novel feature of the invention is the gas diffusion ring 30 that encircles the inside of the enclosure roughly midway between the top and bottom. This serves as a conduit to both evacuate residual air from the enclosure prior to use and to introduce the inert gas to the interior. The operation is best seen by reference to FIGS. 2–4. In FIG. 2 the enclosure is fully deflated and the zipper in the top has been opened at 13 to allow insertion of the parts to be welded. The sides of the upper portion 6 drape in orderly fashion over the edges of the support table so that they are almost completely out of the way of the welder at this point. Note that the diffusion tube 30 is now located at the lowest point of the draped sides 28. After the parts to be welded are inserted and the zipper at the top closed, three way valve 37 (FIG. 5) is opened to a vacuum source 38 to exhaust most of the remaining air in the enclosure. This vacuum need not be high. Normally a vacuum of several inches of water will suffice. Following evacuation valve 37 is turned to the other position where line 40 supplies argon or another appropriate gas to the enclosure.

Figure 4:
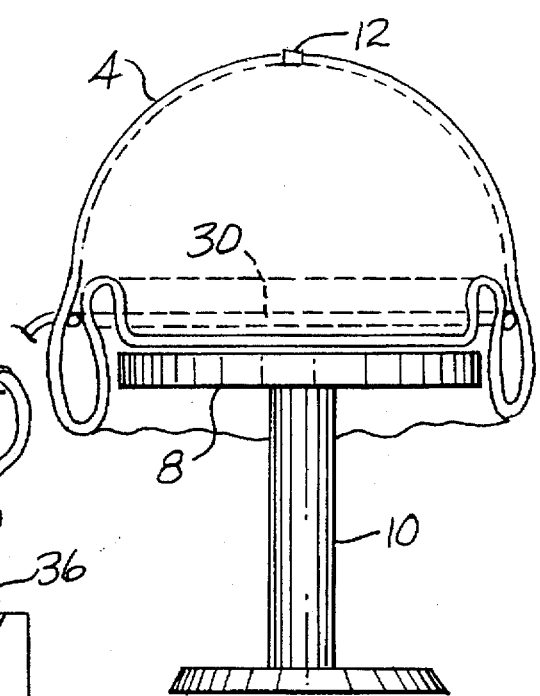
FIGS. 3 and 4 are respective steps, partially in section, in the reinflation of the enclosure by an inert or other gaseous atmosphere.
Figure 3:
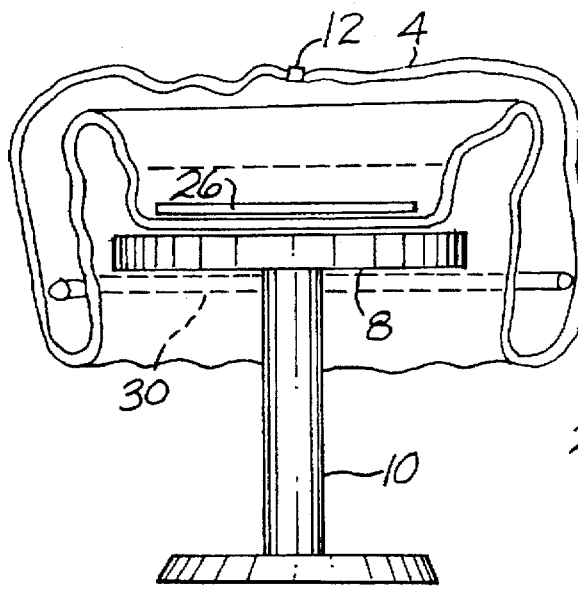

Diffusion ring 30 is supplied with a multiplicity of small openings to permit gentle introduction of the inert gas and prevent significant turbulence. This tube can advantageously be made of a porous sintered or similar material. Since argon is significantly heavier than air, as the chamber gradually fills, as shown in FIGS. 3 and 4, any residual air will be displaced above the argon. Ultimately, when the chamber has expanded to full volume any residual air preceding the argon will then be exhausted through check valve 34 located at the high point in the enclosure. A small flow of gas is maintained throughout any subsequent operations so that a low positive pressure is maintained in the interior of the chamber. This ensures full inflation during use and prevents any intrusion of ambient air. Most other enclosures available require long purge periods, up to 30 minutes or more, before work can begin. This amounts to a significant loss of time and expensive inert gas that must flow continuously during the purge period. The enclosure of the present invention is ready for use within a few minutes after beginning inflation with very little waste of purge gas.

FIG. 5 shows the enclosure ready for the welder to insert his hands and begin work. Welding controller 36 supplies proper electrical currents as well as a water supply to cool the welder head. Additional inert gas may also be supplied to the welder head but this is not ordinarily needed since the inert gas within the enclosure completely surrounds the workpiece.

It will be understood by those skilled in the art that many variations could be made in the enclosure as it has been described and shown without departing from the spirit of the invention. As examples, additional points of entry at other locations are permissible and multiple glove openings may be present to enable two or more welders to work simultaneously. Thus the invention should be considered as being limited only as it is described and set out in the following claims.

I claim:

1. An enclosure for maintaining a controlled gaseous atmosphere around a work zone which comprises:

a completely enclosed flexible and collapsible transparent hood, said hood having a basal portion with a lower surface, an upper portion with an upper surface, and a side surface;

at least one access sleeve extending from the side of the hood to permit entry of utility lines;

at least one pair of gloves hermetically sealed into the side of the hood to receive a worker's hands;

a reclosable opening in the hood to permit insertion of a workpiece and any associated tools, said opening being essentially gas tight when closed;

a vent valve serving as a check valve to allow interior gas to slowly exit but prevent ambient air from entering;

a gas diffusion ring mounted inside the hood approximately midway between the lower and upper surfaces; and coupling means for connection of the diffusion ring to sources of vacuum and inert gas, in order that the enclosure may be sited on a work table in a manner so that when opened the sides drape over the edges of the work table with the gas diffusion ring located at the lowest point of the draped portion, workpieces and any tools may be introduced, and the gas to act as the controlled atmosphere can then be admitted into the diffusion ring to purge any remaining air upward and out of the vent valve as the hood is reinflated to provide an essentially air free working atmosphere.

2. The enclosure of claim 1 in which the horizontal cross sectional area of the upper portion is greater than the cross sectional area of the basal portion to permit more uniform draping while deflated.

3. The enclosure of claim 2 in which the upper and basal portions of the hood have an essentially circular horizontal cross section.

4. The enclosure of claim 1 in which the reclosable opening is a zipper.

5. The enclosure of claim 1 in which the vent valve is located adjacent the highest point on the upper surface.

* * * * *